United States Patent
Damnjanovic et al.

(10) Patent No.: US 11,382,027 B2
(45) Date of Patent: Jul. 5, 2022

(54) LAYER 2 REMOTE RADIO HEAD CONFIGURATION

(71) Applicant: QUALCOMM Incorporated, San Diego, CA (US)

(72) Inventors: Aleksandar Damnjanovic, Del Mar, CA (US); Arumugam Chendamarai Kannan, San Diego, CA (US); Jing Sun, San Diego, CA (US); Srinivas Yerramalli, San Diego, CA (US); Andrei Dragos Radulescu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,788

(22) Filed: Aug. 17, 2020

(65) Prior Publication Data

US 2022/0053413 A1    Feb. 17, 2022

(51) Int. Cl.
*H04W 48/16* (2009.01)
*H04W 76/34* (2018.01)
*H04W 76/11* (2018.01)
*H04W 36/36* (2009.01)
*H04W 48/10* (2009.01)
*H04W 48/20* (2009.01)
*H04W 88/08* (2009.01)

(52) U.S. Cl.
CPC ......... *H04W 48/16* (2013.01); *H04W 36/36* (2013.01); *H04W 48/10* (2013.01); *H04W 48/20* (2013.01); *H04W 76/11* (2018.02); *H04W 76/34* (2018.02); *H04W 88/085* (2013.01)

(58) Field of Classification Search
CPC ... H04W 88/085; H04W 48/10; H04W 48/16; H04W 76/11; H04W 76/34; H04W 36/36; H04W 48/20; H04W 8/005; H04W 48/08; H04W 48/12; H04W 48/17; H04W 48/18
See application file for complete search history.

(56) References Cited

U.S. PATENT DOCUMENTS 9,054,842 B2   6/2015   Bhattad et al.
9,161,299 B2   10/2015  Huang et al.
(Continued)

FOREIGN PATENT DOCUMENTS

WO   2012116007 A1   8/2012

OTHER PUBLICATIONS

International Search Report and Written Opinion—PCT/US2021/070893—ISA/EPO—dated Nov. 16, 2021.

*Primary Examiner* — Diane D Mizrahi
(74) *Attorney, Agent, or Firm* — Harrity & Harrity, LLP

(57) ABSTRACT

Various aspects of the present disclosure generally relate to wireless communication. In some aspects, a remote radio head may transmit, during a user equipment (UE) RRH discovery procedure with a UE, an RRH identifier to the UE for reporting to a base station (BS) associated with the RRH and the UE; receive, from the BS, communication configuration information based at least in part on transmitting the RRH identifier, wherein the communication configuration information includes at least one of scheduling information or configuration information; and communicate with the UE in accordance with the communication configuration information. Numerous other aspects are provided.

30 Claims, 9 Drawing Sheets

(56) References Cited

U.S. PATENT DOCUMENTS

| | | |
|---|---|---|
| 9,380,614 B2 | 6/2016 | Hahn et al. |
| 9,526,049 B2 | 12/2016 | Yuk et al. |
| 10,362,599 B2 | 7/2019 | Choi et al. |
| 10,721,720 B2 * | 7/2020 | Damnjanovic ....... H04L 5/0032 |
| 2014/0335859 A1 | 11/2014 | Hahn et al. |
| 2017/0079003 A1 | 3/2017 | Jl et al. |
| 2018/0213577 A1 * | 7/2018 | Burbidge .............. H04W 76/10 |
| 2019/0380128 A1 | 12/2019 | Park et al. |
| 2021/0051488 A1 * | 2/2021 | Stirling-Gallacher ....................... H04W 56/001 |
| 2021/0314899 A1 * | 10/2021 | Shan .................... H04W 12/06 |

* cited by examiner

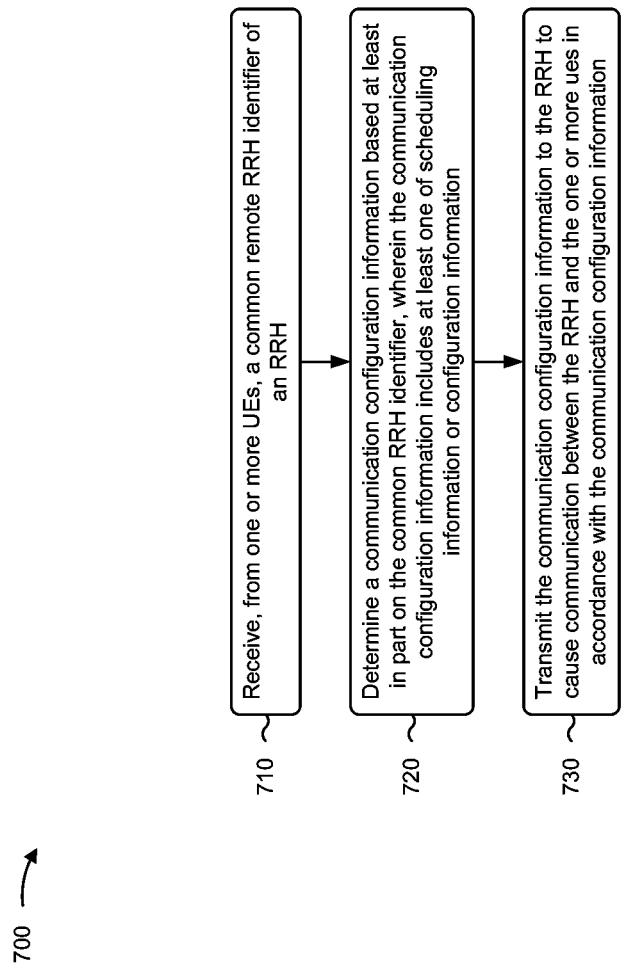

LAYER 2 REMOTE RADIO HEAD CONFIGURATION

FIELD OF THE DISCLOSURE

Aspects of the present disclosure generally relate to wireless communication and to techniques and apparatuses for layer 2 remote radio head configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a remote radio head (RRH) includes transmitting, during a user equipment (UE) RRH discovery procedure with a UE, an RRH identifier to the UE for reporting to a base station (BS) associated with the RRH and the UE; receiving, from the BS, communication configuration information based at least in part on transmitting the RRH identifier, wherein the communication configuration information includes at least one of scheduling information or configuration information; and communicating with the UE in accordance with the communication configuration information.

In some aspects, a method of wireless communication performed by a UE includes receiving, during a discovery procedure with an RRH, an RRH identifier for reporting to a BS associated with the RRH and the UE; reporting the RRH identifier to the BS to trigger a determination of communication configuration information for communication with the RRH, wherein the communication configuration information includes at least one of scheduling information or configuration information; and communicating with the RRH in accordance with the communication configuration information.

In some aspects, a method of wireless communication performed by a BS includes receiving, from one or more UEs, a common RRH identifier of an RRH; determining a communication configuration information based at least in part on the common RRH identifier, wherein the communication configuration information includes at least one of scheduling information or configuration information; and transmitting the communication configuration information to the RRH to cause communication between the RRH and the one or more UEs in accordance with the communication configuration information.

In some aspects, a non-transitory computer-readable medium storing a set of instructions for wireless communication includes one or more instructions that, when executed by one or more processors of an RRH, cause the RRH to transmit, during a discovery procedure with a UE, an RRH identifier to the UE for reporting to a BS associated with the RRH and the UE; receive, from the BS, communication configuration information based at least in part on transmitting the RRH identifier, wherein the communication configuration information includes at least one of scheduling information or configuration information; and communicate with the UE in accordance with the communication configuration information.

In some aspects, a non-transitory computer-readable medium storing a set of instructions for wireless communication includes one or more instructions that, when executed by one or more processors of a UE, cause the UE to receive, during a discovery procedure with an RRH, an RRH identifier for reporting to a BS associated with the RRH and the UE; report the RRH identifier to the BS to trigger a determination of communication configuration information for communication with the RRH, wherein the communication configuration information includes at least one of scheduling information or configuration information; and communicate with the RRH in accordance with the communication configuration information.

In some aspects, a non-transitory computer-readable medium storing a set of instructions for wireless communication includes one or more instructions that, when executed by one or more processors of a BS, cause the BS to: receive, from one or more UEs, a common RRH identifier of an RRH; determine a communication configuration information based at least in part on the common RRH identifier, wherein the communication configuration information includes at least one of scheduling information or configufiguration information to the RRH to cause communication between the RRH and the one or more UEs in accordance with the communication configuration information.

In some aspects, an RRH for wireless communication includes a memory; and one or more processors operatively coupled to the memory, the memory and the one or more processors configured to: transmit, during a discovery procedure with a UE, an RRH identifier to the UE for reporting to a BS associated with the RRH and the UE; receive, from the BS, communication configuration information based at least in part on transmitting the RRH identifier, wherein the communication configuration information includes at least one of scheduling information or configuration information; and communicate with the UE in accordance with the communication configuration information.

In some aspects, a UE for wireless communication includes a memory; and one or more processors operatively coupled to the memory, the memory and the one or more processors configured to receive, during a discovery procedure with an RRH, an RRH identifier for reporting to a BS associated with the RRH and the UE; report the RRH identifier to the BS to trigger a determination of communication configuration information for communication with the RRH, wherein the communication configuration information includes at least one of scheduling information or configuration information; and communicate with the RRH in accordance with the communication configuration information.

In some aspects, a BS for wireless communication includes a memory; and one or more processors operatively coupled to the memory, the memory and the one or more processors configured to receive, from one or more UEs, a common remote RRH identifier of an RRH; determine a communication configuration information based at least in part on the common RRH identifier, wherein the communication configuration information includes at least one of scheduling information or configuration information; and transmit the communication configuration information to the RRH to cause communication between the RRH and the one or more UEs in accordance with the communication configuration information.

In some aspects, an apparatus for wireless communication includes means for transmitting, during a discovery procedure with a UE, an RRH identifier to the UE for reporting to a BS associated with the RRH and the UE; means for receiving, from the BS, communication configuration information based at least in part on transmitting the RRH identifier, wherein the communication configuration information includes at least one of scheduling information or configuration information; and means for communicating with the UE in accordance with the communication configuration information.

In some aspects, an apparatus for wireless communication includes means for receiving, during a discovery procedure with an RRH, an RRH identifier for reporting to a BS associated with the RRH and the apparatus; means for reporting the RRH identifier to the BS to trigger a determination of communication configuration information for communication with the RRH, wherein the communication configuration information includes at least one of scheduling information or configuration information; and means for communicating with the RRH in accordance with the communication configuration information.

In some aspects, an apparatus for wireless communication includes means for receiving, from one or more UEs, a common RRH identifier of an RRH; means for determining a communication configuration information based at least in part on the common RRH identifier, wherein the communication configuration information includes at least one of scheduling information or configuration information; and means for transmitting the communication configuration information to the RRH to cause communication between the RRH and the one or more UEs in accordance with the communication configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5-7 are diagrams illustrating example processes associated with layer 2 RRH configuration, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
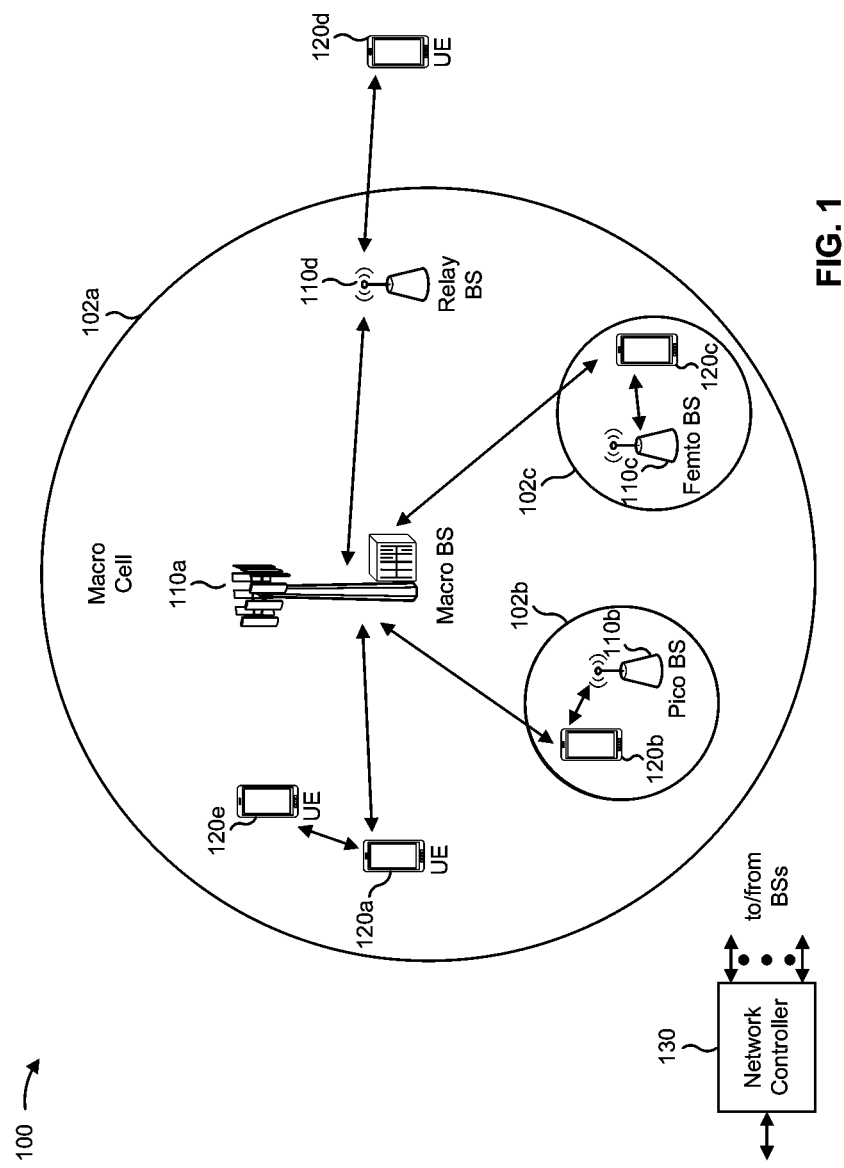
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
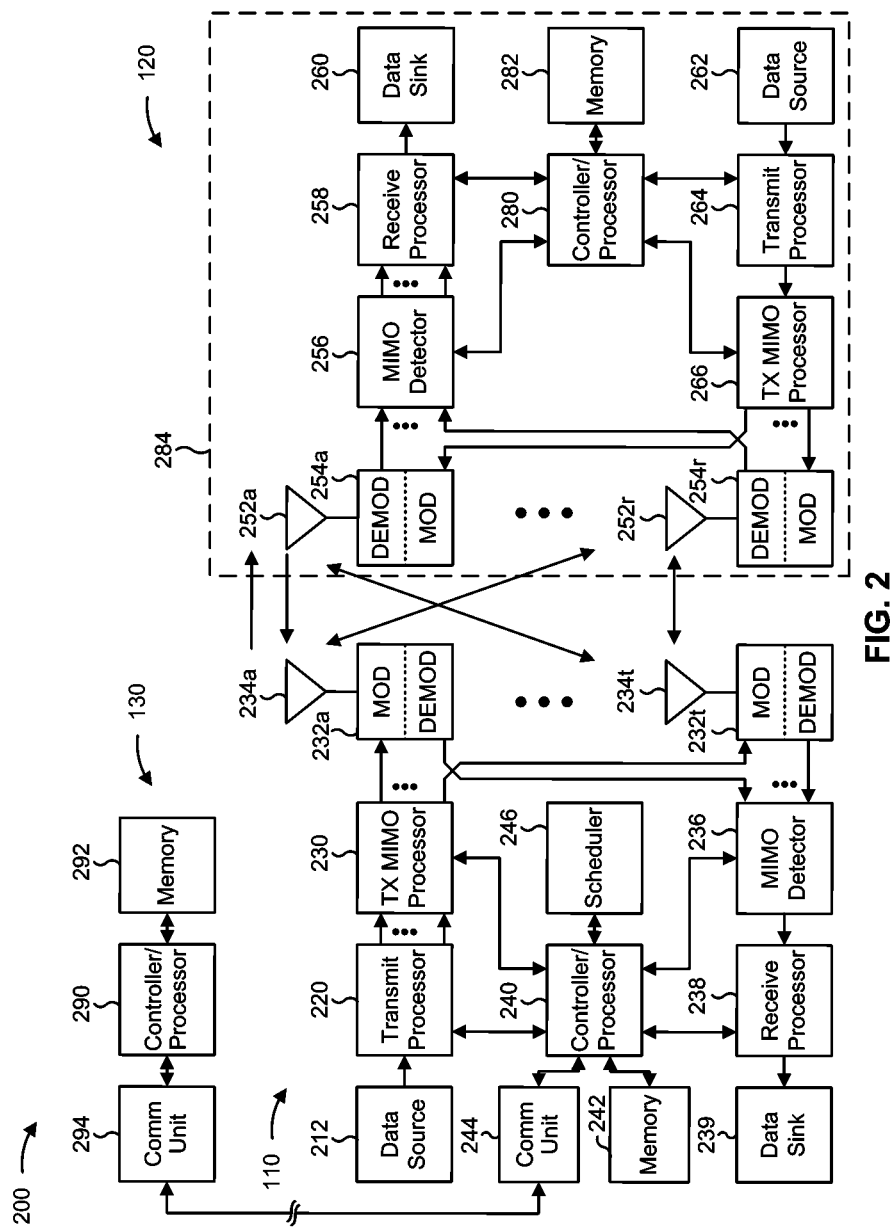
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3A-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3A-7.

Controller/processor 240 of base station 110, controller/processor 280 of UE 120, and/or any other component(s) of FIG. 2 may perform one or more techniques associated with layer 2 remote radio head (RRH) configuration, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, and/or other processes as described herein. In some aspects, executing instructions may include running the instructions, converting the instructions, compiling the instructions, interpreting the instructions, and/or the like.

In some aspects, UE 120 may include means for receiving, during a discovery procedure with an RRH, an RRH identifier for reporting to a base station (BS) associated with the RRH and the UE, means for reporting the RRH identifier to the BS to trigger a determination of communication configuration information for communication with the RRH, means for communicating with the RRH in accordance with the communication configuration information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, an RRH, which may be a component of base station 110, may include means for transmitting, during a discovery procedure with a UE, an RRH identifier to the UE for reporting to base station 110, means for receiving, from base station 110, communication configuration information based at least in part on transmitting the RRH identifier, means for communicating with the UE in accordance with the communication configuration information, and/or the like. In some aspects, base station 110 may include means for receiving, from one or more UEs, a common RRH identifier of an RRH, means for determining a communication configuration information based at least in part on the common RRH identifier, means for transmitting the communication configuration information to the RRH to cause communication between the RRH and the one or more UEs in accordance with the communication configuration information, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3A:
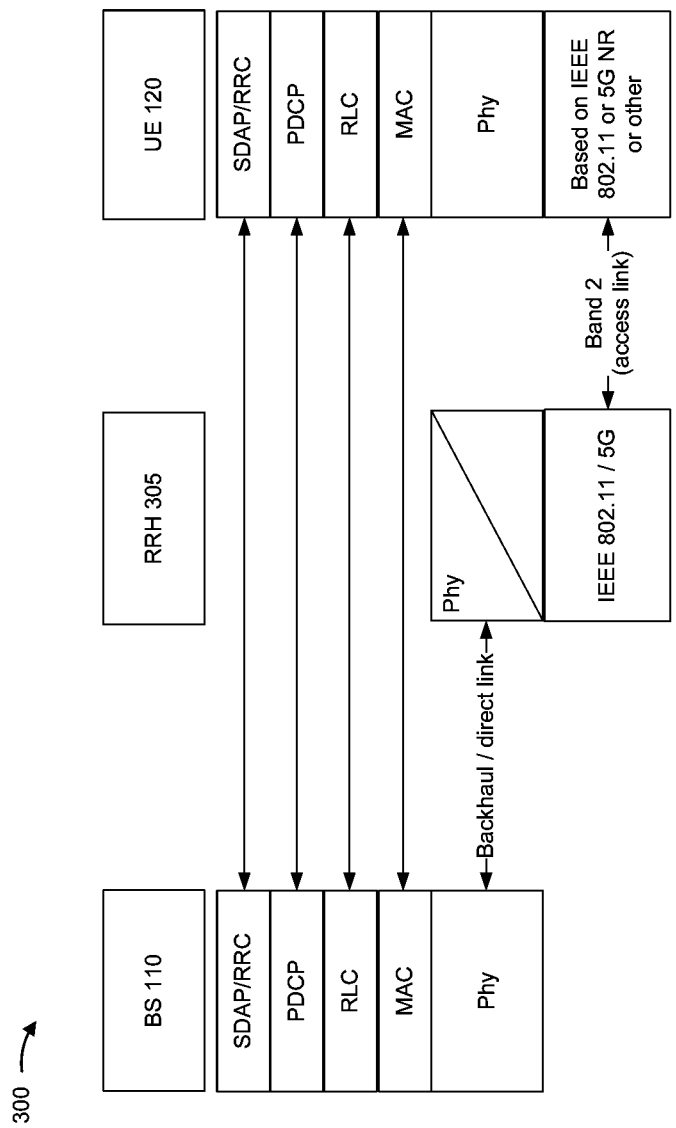
FIGS. 3A-3C are diagrams illustrating an example of a remote radio head (RRH) protocol architecture, in accordance with various aspects of the present disclosure.
Figure 3B:
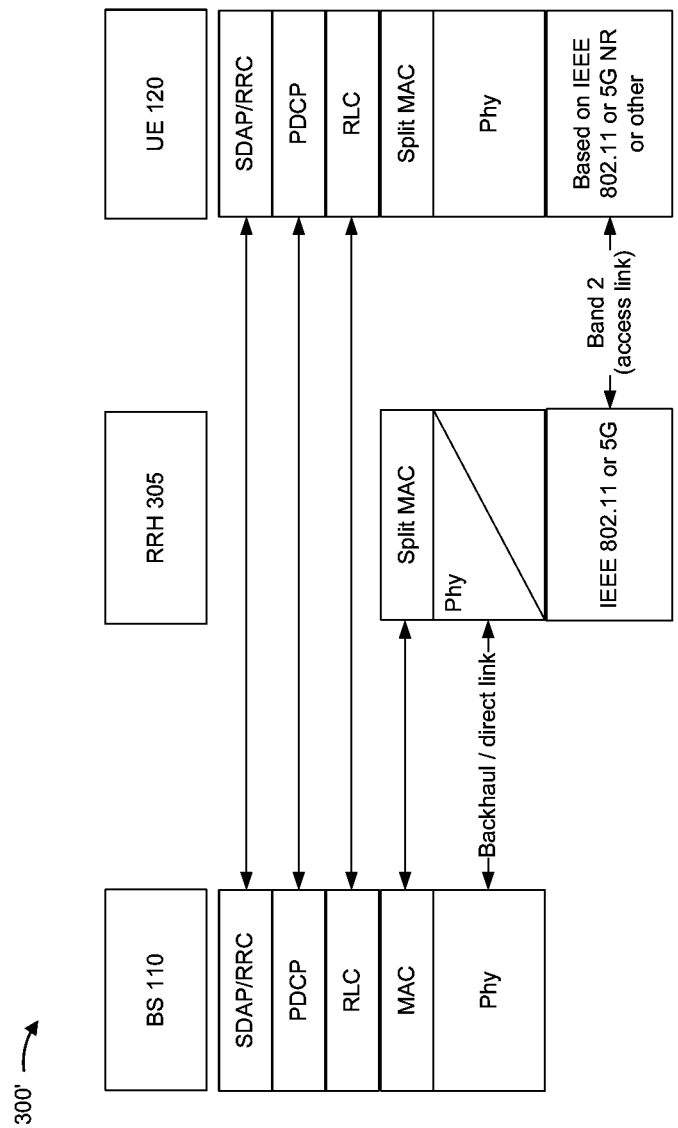
Figure 3C:
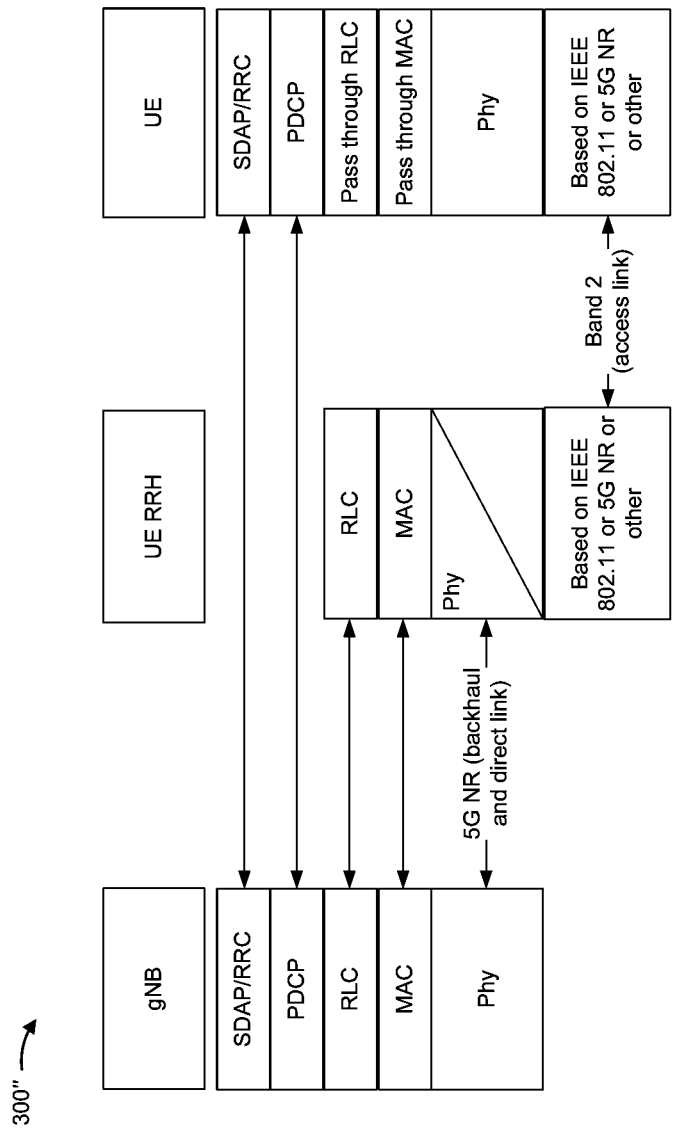

FIGS. 3A-3C are diagrams illustrating examples 300, 300', 300" of a protocol architecture, in accordance with various aspects of the present disclosure.

As shown in FIG. 3A, and by example 300, BS 110 may be associated with an RRH 305 and may use the RRH 305 (e.g., which may be a cooperating transceiver, relay, UE RRH, and/or the like for UE 120, which may be a cooperating UE) for communication with a UE 120. A protocol stack of BS 110 may include a service data adaptation protocol (SDAP) or radio resource control (RRC) layer, a packet data convergence protocol (PDCP) layer, a radio link control (RLC) layer, a medium access control (MAC) layer, and a physical (PHY) layer. Similarly, UE 120 may include an SDAP or RRC layer, a PDCP layer, an RLC layer, a MAC layer, and a PHY layer. In this case, RRH 305 includes, among other layers, a PHY layer that links BS 110 to UE 120. For example, RRH 305 may communicate, at the PHY layer, with BS 110 using a backhaul link or a direct link, and may communicate with UE 120 using a band 2 access link (e.g., using IEEE 802.11 communications, 5G communications, and/or the like).

In this layer 1 protocol architecture, BS 110 may not be aware of a presence of relays (e.g., RRH 305) between BS 110 and UE 120. Furthermore, an association between RRH 305 and UE 120 may be network independent. For example, RRH 305 may be deployed and maintained by, for example, a property owner for use with UEs 120 deployed by the property owner and/or customers of the property owner. In other words, in some cases, RRH 305 may not be deployed by an operator of BS 110. To accommodate such deployments, communications at the MAC layer and above are end-to-end between BS 110 and UE 120, a first portion of PHY layer communications may be end-to-end between BS 110 and UE 120, and a second portion of PHY layer communications may be via a relay using RRH 305. In this case, RRH 305 may provide PHY layer processing for the second portion of PHY layer communications, but not the first portion of PHY layer communications.

In contrast, as shown in FIG. 3B, and by example 300', another deployment may include a split MAC layer. In this case, a first portion of MAC signaling may terminate at RRH 305 and a second portion of MAC signaling may be end-to-end between BS 110 and UE 120. For example, RRH 305 may generate a power headroom report, whereas UE 120 may generate a buffer status report. Additionally, or alternatively, rather than a split MAC layer, RRH 305 may implement a whole MAC layer and perform all MAC processing.

As another example, as shown in FIG. 3C, and by example 300", another deployment may include RLC termination at RRH 305. For example, based at least in part on RRH 305 not being controlled by BS 110, a UE 120 may pass a PHY layer, MAC layer, layer 2 (RLC layer), and/or the like configuration to RRH 305. In this case, an RLC reset may occur when UE 120 switches to which RRH 305, of a group of available RRHs, UE 120 is attached. In this example, UE 120 may pass through most MAC functionality to RRH 305 and may retain limited MAC functionality, such as generating buffer status reports. Such a protocol architecture may be implemented, for example, for layer 2 integrated access and backhauling (IAB) deployments.

As indicated above, FIG. 3A-3C is provided as an example. Other examples may differ from what is described with respect to FIG. 3A-3C.

In the aforementioned protocol architectures, a BS may not directly control an RRH. For example, the BS may not schedule the RRH, but may schedule a single UE associated with the RRH. However, associating a single UE with a single RRH may be restrictive for some deployment scenarios. For example, in some cases an RRH may be capable of handling communications for a plurality of UEs. However, the BS may not have information indicating that an RRH is serving a plurality of UEs, which may result in communication interruptions for uplink traffic for the plurality of UEs. For example, the BS may schedule concurrent uplink transmissions for UEs associated with the same RRH, which may result in interference, dropped communications, and/or the like.

Some aspects described herein enable reporting of an association between a UE and an RRH, which may enable a BS to schedule one or more UEs associated with the RRH to avoid communication interruptions caused by interference, dropped communications, and/or the like. For example, an RRH may broadcast an RRH identifier to a group of UEs, the group of UEs may each report the RRH identifier when the group of UEs each attach to the RRH, and the BS may use the RRH identifier to associate the group of UEs with the RRH and schedule the group of UEs to avoid collisions between, for example, uplink transmissions. In this way, an RRH, a UE, a BS, and/or the like may enable use of an RRH with a split protocol stack (e.g., a split PHY layer, a split MAC layer, a split RLC layer, and/or the like) with reduced interference, dropped communications, and/or the like.

Figure 4:
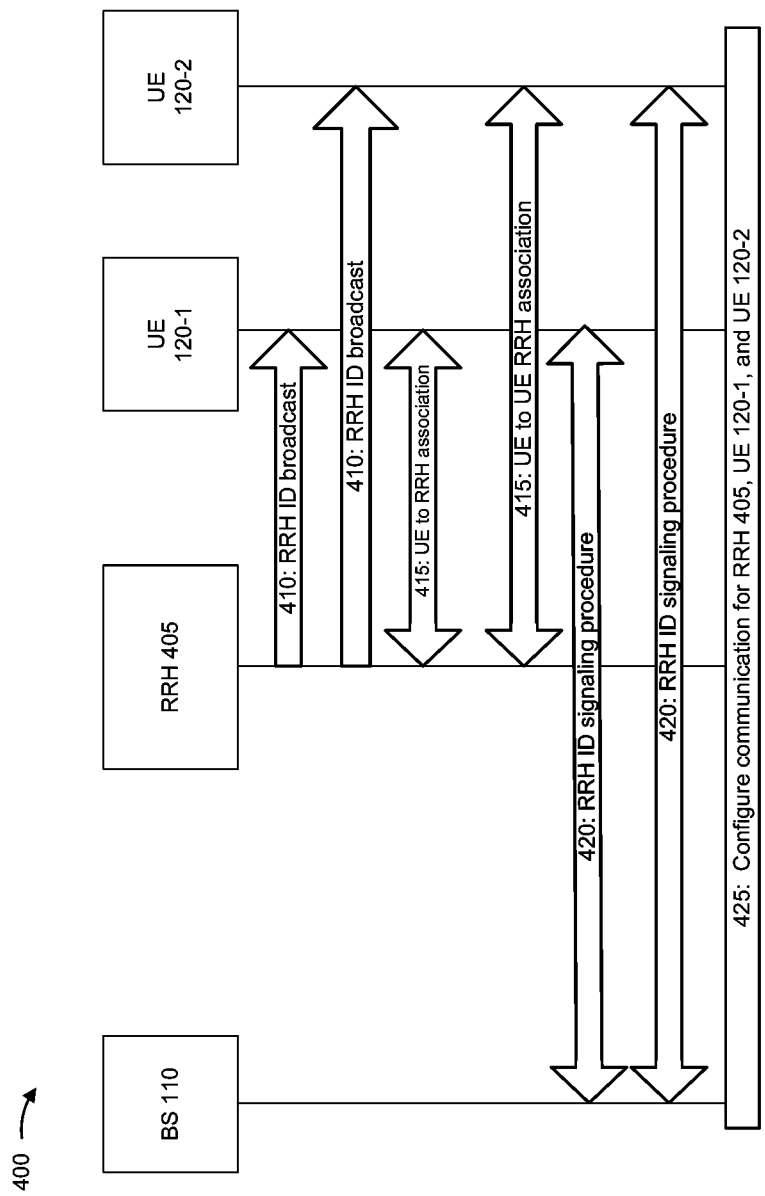
FIG. 4 is a diagram illustrating an example associated with layer 2 RRH configuration, in accordance with various aspects of the present disclosure.

FIG. 4 is a diagram illustrating an example 400 associated with layer 2 RRH configuration, in accordance with various aspects of the present disclosure. As shown in FIG. 4, example 400 includes a BS 110, a first UE 120-1, a second UE 120-2, and an RRH 405.

As further shown in FIG. 4, and by reference numbers 410, RRH 405 may transmit information conveying an RRH identifier to a set of UEs 120. For example, during a discovery procedure, RRH 405 may broadcast an RRH identifier to first UE 120-1 and to second UE 120-2. Additionally, or alternatively, RRH 405 may transmit dedicated signaling to first UE 120-1 and to second UE 120-2 to convey the RRH identifier.

As further shown in FIG. 4, and by reference numbers 415, RRH 405 may associate itself with the set of UEs 120. For example, first UE 120-1 and second UE 120-2 may attach to RRH 405 based at least in part on receiving the RRH identifier, and RRH 405 and/or the set of UEs 120 may store an indication of an association between RRH 405 and the set of UEs 120.

As further shown in FIG. 4, and by reference numbers 420, the set of UEs 120 may report the RRH identifier to BS 110. For example, first UE 120-1 may provide information conveying the RRH identifier to BS 110 to indicate to BS 110 that first UE 120-1 is attached to RRH 405. Similarly, second UE 120-2 may provide information conveying the RRH identifier to BS 110 to indicate to BS 110 that second UE 120-2 is attached to RRH 405. In this case, based at least in part on determining that both first UE 120-1 and second UE 120-2 are attached to RRH 405, BS 110 may group first UE 120-1 and second UE 120-2 into a UE group.

As further shown in FIG. 4, and by reference number 425, BS 110 may configure communication for RRH 405, first UE 120-1, and second UE 120-2. For example, based at least in part on grouping first UE 120-1 and second UE 120-2 into a UE group, BS 110 may transmit communication configuration information to schedule uplink communications for the UE group to avoid interference. In this case, BS 110 may schedule first UE 120-1 for transmission using first resources (e.g., first time resources, frequency resources, and/or the like) and may schedule second UE 120-2 for transmission using second resources (e.g., second time resources, frequency resources, and/or the like). Additionally, or alternatively, BS 110 may transmit communication configuration information to configure first UE 120-1 for transmission (e.g., using a particular transmission power, beam direction, and/or the like) to avoid interference with second UE 120-2. In some aspects, BS 110 may perform a network optimization procedure. For example, based at least in part on information indicating an association between the set of UEs 120 and RRH 405, BS 110 may optimize one or more network parameters to improve network performance without managing links between RRH 405 and the set of UEs 120.

As a result, the set of UEs 120 may communicate, for example, with BS 110 via RRH 405 in accordance with the communication configuration, thereby avoiding dropped communications. For example, first UE 120-1 may transmit using first scheduled resources and/or a first configuration and second UE 120-2 may transmit using second scheduled resources and/or a second configuration. In some aspects, BS 110 may update information associated with the set of UEs 120 into a UE group. For example, first UE 120-1 may disconnect from RRH 405 and/or switch from a connection with RRH 405 to another RRH. In this case, first UE 120-1 may report, to BS 110, the disconnection and/or report another RRH identifier associated with the other RRH. Based at least in part on receiving the indication of the disconnection or the report of the other RRH identifier, BS 110 may disassociate first UE 120-1 from the UE group and/or associate first UE 120-1 with another UE group. Additionally, or alternatively, BS 110 may transmit communication configuration information to update scheduling and/or a configuration for first UE 120-1, second UE 120-2, and/or the like.

As indicated above, FIG. 4 is provided as an example. Other examples may differ from what is described with respect to FIG. 4.

Figure 5:

FIG. 5 is a diagram illustrating an example process 500 performed, for example, by an RRH, in accordance with various aspects of the present disclosure. Example process 500 is an example where the RRH (e.g., RRH 405, BS 110, and/or the like) performs operations associated with layer 2 remote radio head configuration.

As shown in FIG. 5, in some aspects, process 500 may include transmitting, during a discovery procedure with a UE, an RRH identifier to the UE for reporting to a BS associated with the RRH and the UE (block 510). For example, the RRH (e.g., using controller/processor 240, transmit processor 220, TX MIMO processor 230, MOD 232, antenna 234, and/or the like) may transmit, during a discovery procedure with a UE, an RRH identifier to the UE for reporting to a BS associated with the RRH and the UE, as described above in connection with FIG. 4.

As further shown in FIG. 5, in some aspects, process 500 may include receiving, from the BS, communication configuration information based at least in part on transmitting the RRH identifier, wherein the communication configuration information includes at least one of scheduling information or configuration information (block 520). For example, the RRH (e.g., using antenna 234, DEMOD 232, MIMO detector 236, receive processor 238, controller/processor 240, and/or the like) may receive, from the BS, communication configuration information based at least in part on transmitting the RRH identifier, as described above. In some aspects, the communication configuration information includes at least one of scheduling information or configuration information.

As further shown in FIG. 5, in some aspects, process 500 may include communicating with the UE in accordance with the communication configuration information (block 530). For example, the RRH (e.g., using controller/processor 240, transmit processor 220, TX MIMO processor 230, MOD 232, antenna 234, DEMOD 232, MIMO detector 236, receive processor 238, and/or the like) may communicate with the UE in accordance with the communication configuration information, as described above in connection with FIG. 4.

Process 500 may include additional aspects, such as any single aspect or any combination of aspects described below and/or in connection with one or more other processes described elsewhere herein.

In a first aspect, transmitting the RRH identifier includes broadcasting the RRH identifier.

In a second aspect, alone or in combination with the first aspect, the RRH is configured to manage a link with the UE in accordance with the communication configuration information.

In a third aspect, alone or in combination with one or more of the first and second aspects, the communication configuration information includes a communication restriction against a plurality of UEs concurrently transmitting to the RRH on an uplink.

In a fourth aspect, alone or in combination with one or more of the first through third aspects, the RRH is associated with a plurality of UEs.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
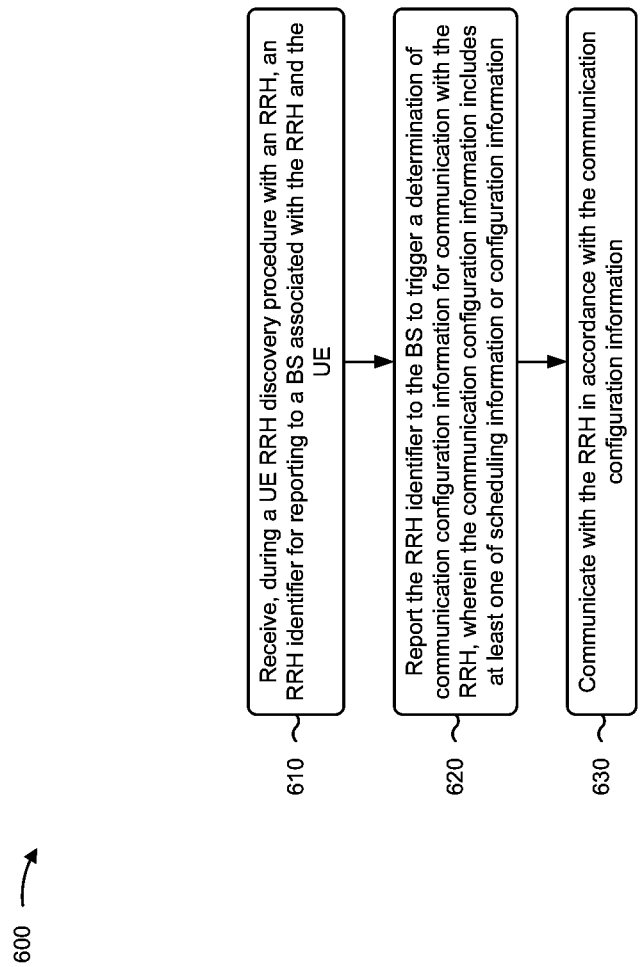

FIG. 6 is a diagram illustrating an example process 600 performed, for example, by a UE, in accordance with various aspects of the present disclosure. Example process 600 is an example where the UE (e.g., UE 120 and/or the like) performs operations associated with layer 2 remote radio head configuration.

As shown in FIG. 6, in some aspects, process 600 may include receiving, during a UE remote RRH discovery procedure with an RRH, an RRH identifier for reporting to a BS associated with the RRH and the UE (block 610). For example, the UE (e.g., using receive processor 258, transmit processor 264, controller/processor 280, memory 282, and/or the like) may receive, during a discovery procedure with an RRH, an RRH identifier for reporting to a BS associated with the RRH and the UE, as described above.

As further shown in FIG. 6, in some aspects, process 600 may include reporting the RRH identifier to the BS to trigger a determination of communication configuration information for communication with the RRH, wherein the communication configuration information includes at least one of scheduling information or configuration information (block 620). For example, the UE (e.g., using receive processor 258, transmit processor 264, controller/processor 280, memory 282, and/or the like) may report the RRH identifier to the BS to trigger a determination of communication configuration information for communication with the RRH, as described above. In some aspects, the communication configuration information includes at least one of scheduling information or configuration information.

As further shown in FIG. 6, in some aspects, process 600 may include communicating with the RRH in accordance with the communication configuration information (block 630). For example, the UE (e.g., using receive processor 258, transmit processor 264, controller/processor 280, memory 282, and/or the like) may communicate with the RRH in accordance with the communication configuration information, as described above.

Process 600 may include additional aspects, such as any single aspect or any combination of aspects described below and/or in connection with one or more other processes described elsewhere herein.

In a first aspect, receiving the RRH identifier includes receiving the RRH identifier via a broadcast communication.

In a second aspect, alone or in combination with the first aspect, the RRH is configured to manage a link with the UE in accordance with the communication configuration information.

In a third aspect, alone or in combination with one or more of the first and second aspects, the communication configuration information includes a communication restriction against a plurality of UEs concurrently transmitting to the RRH on an uplink.

In a fourth aspect, alone or in combination with one or more of the first through third aspects, the RRH is associated with a plurality of UEs.

In a fifth aspect, alone or in combination with one or more of the first through fourth aspects, the plurality of UEs are associated into a UE group based at least in part on the UE reporting the RRH identifier.

In a sixth aspect, alone or in combination with one or more of the first through fifth aspects, process 600 includes associating with another RRH; and reporting, to the BS, a new RRH ID associated with the other RRH.

In a seventh aspect, alone or in combination with one or more of the first through sixth aspects, process 600 includes disconnecting from the RRH; and reporting, to the BS, an indication of an end of an association with the RRH.

In an eighth aspect, alone or in combination with one or more of the first through seventh aspects, process 600 includes associating with another RRH; and reporting, to the BS, an indication of an end of an association with the RRH.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a BS, in accordance with various aspects of the present disclosure. Example process 700 is an example where the BS (e.g., BS 110 and/or the like) performs operations associated with layer 2 remote radio head configuration.

As shown in FIG. 7, in some aspects, process 700 may include receiving, from one or more UEs, a common RRH identifier of an RRH (block 710). For example, the BS (e.g., using transmit processor 220, receive processor 238, controller/processor 240, memory 242, and/or the like) may receive, from one or more user equipment (UEs), a common RRH identifier (e.g., the same RRH identifier) of an RRH, as described above.

As further shown in FIG. 7, in some aspects, process 700 may include determining a communication configuration information based at least in part on the common RRH identifier, wherein the communication configuration information includes at least one of scheduling information or configuration information (block 720). For example, the BS (e.g., using transmit processor 220, receive processor 238, controller/processor 240, memory 242, and/or the like) may determine a communication configuration information based at least in part on the common RRH identifier, as described above. In some aspects, the communication configuration information includes at least one of scheduling information or configuration information.

As further shown in FIG. 7, in some aspects, process 700 may include transmitting the communication configuration information to the RRH to cause communication between the RRH and the one or more UEs in accordance with the communication configuration information (block 730). For example, the BS (e.g., using transmit processor 220, receive processor 238, controller/processor 240, memory 242, and/or the like) may transmit the communication configuration information to the RRH to cause communication between the RRH and the one or more UEs in accordance with the communication configuration information, as described above.

Process 700 may include additional aspects, such as any single aspect or any combination of aspects described below and/or in connection with one or more other processes described elsewhere herein.

In a first aspect, the common RRH identifier is a broadcast common RRH identifier.

In a second aspect, alone or in combination with the first aspect, the RRH is configured to manage a link with the one or more UEs in accordance with the communication configuration information.

In a third aspect, alone or in combination with one or more of the first and second aspects, the communication configuration information includes a communication restriction against a plurality of UEs, of the one or more UEs, concurrently transmitting to the RRH on an uplink.

In a fourth aspect, alone or in combination with one or more of the first through third aspects, determining the communication configuration information includes determining the communication configuration information for the UE group.

In a fifth aspect, alone or in combination with one or more of the first through fourth aspects, process 700 includes receiving, from a UE of the one or more UEs, reporting indicating a new RRH ID associated with another RRH; and updating the communication configuration information based at least in part on the reporting.

In a sixth aspect, alone or in combination with one or more of the first through fifth aspects, process 700 includes receiving, from a UE of the one or more UEs, reporting indicating an end of an association with the RRH; and updating the communication configuration information based at least in part on the reporting.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and one or more processors coupled to the memory, the one or more processors configured to:
receive, during a UE remote radio head (RRH) discovery procedure with an RRH, an RRH identifier associated with the UE and a second UE;
report the RRH identifier to a base station (BS), associated with the RRH, the UE, and the second UE, to trigger a determination of communication configuration information, associated with the UE and the RRH, and second communication configuration information associated the second UE and the RRH, wherein each of the communication configuration information and the second communication configuration information includes at least one of scheduling information or configuration information, and wherein the second communication configuration information is different from the communication configuration information; and
communicate with the RRH in accordance with the communication configuration information.

2. The UE of claim 1, wherein the one or more processors, to receive the RRH identifier, are configured to:
receive the RRH identifier via a broadcast communication.

3. The UE of claim 1, wherein the RRH is configured to manage a link with the UE in accordance with the communication configuration information.

4. The UE of claim 1, wherein the communication configuration information includes a communication restriction against a plurality of UEs, including at least one of the UE or the second UE, concurrently transmitting to the RRH on an uplink.

5. The UE of claim 1, wherein the RRH is associated with a plurality of UEs including the second UE.

6. The UE of claim 5, wherein the plurality of UEs are associated into a UE group based at least in part on reporting the RRH identifier.

7. The UE of claim 1, wherein the one or more processors are further configured to:
associate with another RRH; and
report, to the BS, a new RRH ID associated with the other RRH.

8. The UE of claim 1, wherein the one or more processors are further configured to:
disconnect from the RRH; and
report, to the BS, an indication of an end of an association with the RRH.

9. The UE of claim 1, wherein the one or more processors are further configured to:
associate with another RRH; and
report, to the BS, an indication of an end of an association with the RRH.

10. A method of wireless communication performed by a user equipment (UE), comprising:
receiving, during a UE remote radio head (RRH) discovery procedure with an RRH, an RRH identifier associated with the UE and a second UE;
reporting the RRH identifier to a base station (BS), associated with the RRH, the UE, and the second UE, to trigger a determination of communication configuration information, associated with the UE and the RRH, and second communication configuration information associated the second UE and the RRH, wherein each of the communication configuration information and the second communication configuration information includes at least one of scheduling information or configuration information, and wherein the second communication configuration information is different from the communication configuration information; and
communicating with the RRH in accordance with the communication configuration information.

11. The method of claim 10, wherein receiving the RRH identifier comprises:
receiving the RRH identifier via a broadcast communication.

12. The method of claim 10, wherein the RRH is configured to manage a link with the UE in accordance with the communication configuration information.

13. The method of claim 10, wherein the communication configuration information includes a communication restriction against a plurality of UEs, including at least one of the UE or the second UE, concurrently transmitting to the RRH on an uplink.

14. The method of claim 10, wherein the RRH is associated with a plurality of UEs including the second UE.

15. The method of claim 14, wherein the plurality of UEs are associated into a UE group based at least in part on reporting the RRH identifier.

16. The method of claim 10, further comprising:
associating with another RRH; and
reporting, to the BS, a new RRH ID associated with the other RRH.

17. The method of claim 10, further comprising:
disconnecting from the RRH; and
reporting, to the BS, an indication of an end of an association with the RRH.

18. The method of claim 10, further comprising:
associating with another RRH; and
reporting, to the BS, an indication of an end of an association with the RRH.

19. A non-transitory computer-readable medium storing a set of instructions for wireless communication, the set of instructions comprising:
one or more instructions that, when executed by one or more processors of a user equipment (UE), cause the UE to:
receive, during a UE remote radio head (RRH) discovery procedure with an RRH, an RRH identifier associated with the UE and a second UE;
report the RRH identifier to a base station (BS), associated with the RRH, the UE, and the second UE, to trigger a determination of communication configuration information, associated with the UE and the RRH, and second communication configuration information associated the second UE and the RRH, wherein each of the communication configuration information and the second communication configuration information includes at least one of scheduling information or configuration information, and wherein the second communication configuration information is different from the communication configuration information; and
communicate with the RRH in accordance with the communication configuration information.

20. The non-transitory computer-readable medium of claim 19, wherein the one or more instructions, that cause the UE to receive the RRH identifier, cause the UE to:
receive the RRH identifier via a broadcast communication.

21. The non-transitory computer-readable medium of claim 19, wherein the one or more instructions further cause the UE to manage a link with the UE in accordance with the communication configuration information.

22. The non-transitory computer-readable medium of claim 19, wherein at least one of:
the communication configuration information includes a communication restriction against a plurality of UEs, including the second UE, concurrently transmitting to the RRH on an uplink, or
the RRH is associated with the plurality of UEs.

23. The non-transitory computer-readable medium of claim 19, wherein the one or more instructions further cause the UE to:
associate with another RRH; and
report, to the BS, at least one of a new RRH ID, associated with the other RRH, or an indication of an end of an association with the RRH.

24. The non-transitory computer-readable medium of claim 19, wherein the one or more instructions further cause the UE to:
disconnect from the RRH; and
report, to the BS, an indication of an end of an association with the RRH.

25. An apparatus for wireless communication, comprising:
means for receiving, during an apparatus remote radio head (RRH) discovery procedure with an RRH, an RRH identifier associated with the apparatus and a second apparatus;
means for reporting the RRH identifier to a base station (BS), associated with the RRH, the apparatus, and the second apparatus, to trigger a determination of communication configuration information, associated with the apparatus and the RRH, and second communication configuration information associated the second apparatus and the RRH, wherein each of the communication configuration information and the second communication configuration information includes at least one of scheduling information or configuration information, and wherein the second communication configuration information is different from the communication configuration information; and
means for communicating with the RRH in accordance with the communication configuration information.

26. The apparatus of claim 25, wherein the means for receiving the RRH identifier comprises:
means for receiving the RRH identifier via a broadcast communication.

27. The apparatus of claim 25, further comprising means for managing a link with the apparatus in accordance with the communication configuration information.

28. The apparatus of claim 25, wherein at least one of:
the communication configuration information includes a communication restriction against a plurality of apparatuses, including the second apparatus, concurrently transmitting to the RRH on an uplink, or
the RRH is associated with the plurality of apparatuses.

29. The apparatus of claim 25, further comprising:
means for associating with another RRH; and
means for reporting, to the BS, at least one of a new RRH ID, associated with the other RRH, or an indication of an end of an association with the RRH.

30. The apparatus of claim 25, further comprising:
means for disconnecting from the RRH; and
means for reporting, to the BS, an indication of an end of an association with the RRH.

* * * * *